United States Patent
Oikawa et al.

(10) Patent No.: US 11,782,414 B2
(45) Date of Patent: Oct. 10, 2023

(54) CHATTER VIBRATION DETERMINATION DEVICE, MACHINE LEARNING DEVICE, AND SYSTEM

(71) Applicant: Fanuc Corporation, Yamanashi (JP)

(72) Inventors: Kouki Oikawa, Yamanashi (JP); Kenta Yamamoto, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 674 days.

(21) Appl. No.: 16/800,473

(22) Filed: Feb. 25, 2020

(65) Prior Publication Data

US 2020/0272122 A1    Aug. 27, 2020

(30) Foreign Application Priority Data

Feb. 27, 2019   (JP) .................................. 2019-034543

(51) Int. Cl.
    *G05B 19/404*    (2006.01)
    *G06N 20/00*    (2019.01)

(52) U.S. Cl.
    CPC ........... *G05B 19/404* (2013.01); *G06N 20/00* (2019.01); *G05B 2219/37434* (2013.01); *G05B 2219/41115* (2013.01); *G05B 2219/41256* (2013.01)

(58) Field of Classification Search
    CPC ........ G05B 19/404; G05B 2219/41256; G05B 2219/37434; G05B 2219/41115; G06N 20/00
    See application file for complete search history.

(56) References Cited

U.S. PATENT DOCUMENTS

| 9,956,661 B2* | 5/2018 | Hwang | G05B 19/404 |
| 10,022,832 B2* | 7/2018 | Piner | G05B 19/404 |
| 10,248,104 B2* | 4/2019 | Chen | G05B 19/4065 |
| 2012/0010744 A1* | 1/2012 | Yamashita | B23Q 17/0976 700/173 |
| 2012/0095724 A1* | 4/2012 | Ando | B23Q 17/12 702/145 |

(Continued)

FOREIGN PATENT DOCUMENTS

| JP | 3005663 B2 | 1/2000 |
| JP | 2017045300 A | 3/2017 |

(Continued)

OTHER PUBLICATIONS

Japanese Notice of Reasons for Refusal for Japanese Application No. 2019-034543, dated May 20, 2021 with translation, 5 pages.

*Primary Examiner* — Vincent H Tran
(74) *Attorney, Agent, or Firm* — RatnerPrestia

(57) ABSTRACT

A chatter vibration determination device is provided with a machine learning device configured to observe machining condition data including a feed speed and a spindle rotational frequency in cutting as state data representative of the current state of environment, execute processing related to machine learning using a learning model obtained by modeling the relationship of chatter vibration with a machining condition for the cutting, based on the state data, and estimate the occurrence/non-occurrence of chatter vibration and the improvement of the chatter vibration. The chatter vibration determination device outputs the result of the estimation of the occurrence/non-occurrence of the chatter vibration and the improvement of the chatter vibration.

12 Claims, 12 Drawing Sheets

(56) References Cited

U.S. PATENT DOCUMENTS

| | | | |
|---|---|---|---|
| 2012/0226374 A1* | 9/2012 | Yasuda | B23Q 17/0976 |
| | | | 700/108 |
| 2015/0254336 A1* | 9/2015 | Besuchet | G05B 19/404 |
| | | | 707/737 |
| 2016/0116899 A1* | 4/2016 | Piner | B23Q 11/0039 |
| | | | 700/173 |
| 2016/0346891 A1* | 12/2016 | Ando | G05B 19/404 |
| 2017/0060104 A1* | 3/2017 | Genma | G05B 13/0265 |
| 2017/0090430 A1* | 3/2017 | Nakazawa | G05B 13/028 |
| 2018/0164757 A1* | 6/2018 | Matsushima | G05B 13/027 |
| 2019/0005413 A1 | 1/2019 | Sato | |
| 2020/0061768 A1 | 2/2020 | Morita et al. | |

FOREIGN PATENT DOCUMENTS

| | | | |
|---|---|---|---|
| JP | 2018094686 A | | 6/2018 |
| JP | 2019012392 A | | 1/2019 |
| JP | 2020082304 A | * | 6/2020 |
| WO | 2018105175 A1 | | 6/2018 |

\* cited by examiner

◯⋯⋯◯ :CLUSTER (CLUSTER BOUNDARY)

● :STATE DATA ACQUIRED WHEN NO CHATTER VIBRATION IS GENERATED IN SPECIFIED MACHINE TOOL

○ :CURRENTLY DETECTED STATE VARIABLE

✕ :CENTER OF CLUSTER

△ :STABLE REGION OF CHATTER VIBRATION MEASURED IN ANOTHER MACHINE TOOL

△ :STABLE REGION OF CHATTER VIBRATION MEASURED IN ANOTHER MACHINE TOOL

CHATTER VIBRATION DETERMINATION DEVICE, MACHINE LEARNING DEVICE, AND SYSTEM

RELATED APPLICATION

The present application claims priority to Japanese Application Number 2019-034543 filed Feb. 27, 2019, the disclosure of which is hereby incorporated by reference herein in its entirety.

BACKGROUND OF THE INVENTION

Field of the Invention

The present invention relates to a chatter vibration determination device, machine learning device, and system.

Description of the Related Art

In performing machining with a machine tool, tools are used for the machining based on a path, feed speed, and spindle rotational frequency commanded by programs. Depending on the commands, when this is done, chatter vibration may sometimes occur and adversely affect machined surfaces. When chatter vibration is generated during the machining, a worker used to adjust the spindle rotational frequency and the feed speed to find out a machining condition or conditions in which chatter vibration never occurs.

Japanese Patent No. 3005663 discloses an abnormality avoidance control method in which monitoring based on sensor data is performed during machining, the cause of abnormality such as machine vibration or tool damage, if any, is identified, machining is performed in a machining condition different from a normal machining condition within a preset range, and a machining program is modified so that the machining condition does not permit the occurrence of abnormality attributable to the identified cause.

Whether or not chatter vibration occurs during the machining depends on machining conditions, such as the spindle rotational frequency, relative feed speeds of a workpiece and a tool, and depth of cut, set by the worker during the machining, and the used tool, workpiece material, frequency characteristic of the machine vibration, and the like. When chatter vibration occurs during the machining, the worker used to overcome it by adjusting the machining conditions, such as the spindle rotational frequency, relative feed speeds of the workpiece and the tool, and depth of cut, so that the chatter vibration is reduced.

However, the worker would want to adjust the machining conditions by determining the occurrence of substantial chatter vibration before the chatter vibration actually occurs during cutting work. Moreover, there is a problem that if the occurrence of the substantial chatter vibration is determined, the machining conditions should be adjusted without detecting the machining condition(s) to be adjusted to reduce the chatter vibration and the way of the adjustment by trial and error.

SUMMARY OF THE INVENTION

Accordingly, there is a demand for a device or a system that has a function of determining the occurrence of chatter vibration according to the state of cutting and enables adjustment of a machining condition for the reduction of the chatter vibration as required.

One aspect of the present invention is a chatter vibration determination device configured to control a machine tool for cutting a workpiece by relatively moving the workpiece and a tool. The chatter vibration determination device comprises a machine learning device configured to observe machining condition data including a feed speed and a spindle rotational frequency in the cutting as state data representative of the current state of environment, execute processing related to machine learning using a learning model obtained by modeling the relationship of chatter vibration with a machining condition for the cutting, based on the state data, and estimate the occurrence/non-occurrence of chatter vibration and the improvement of the chatter vibration, and outputs the result of the estimation of the occurrence/non-occurrence of the chatter vibration and the improvement of the chatter vibration.

Another aspect of the present invention is a machine learning device configured to observe machining condition data including a feed speed and a spindle rotational frequency in cutting in a machine tool for cutting a workpiece by relatively moving the workpiece and a tool, as state data representative of the current state of environment, execute processing related to machine learning using a learning model obtained by modeling the relationship of chatter vibration with a machining condition for the cutting, based on the state data, and estimate the occurrence/non-occurrence of chatter vibration and the improvement of the chatter vibration.

According to the one aspect of the present invention, occurrence of substantial chatter vibration during cutting by a machine tool is determined in advance by machine learning so that the adjustment of a machining condition for the reduction of chatter vibration can be estimated as required. Based on the contents of the estimated adjustment of the machining condition, the machining condition can be automatically adjusted or an improvement plan therefor can be displayed as guidance, so that a worker can easily adjust the machining condition before chatter vibration occurs.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Embodiments of the present invention will now be described with reference to the accompanying drawings.

Figure 1:
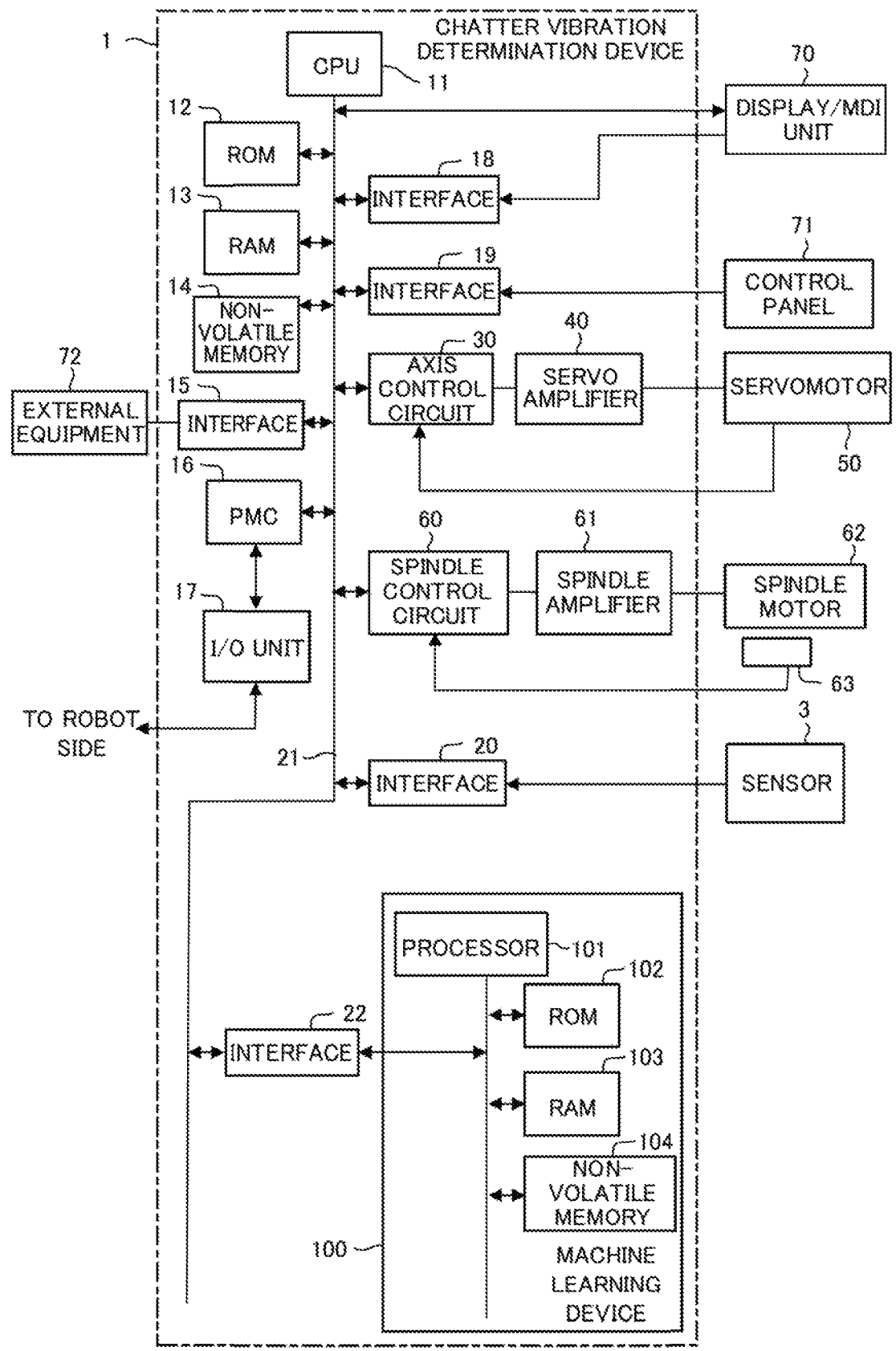
FIG. 1 is a schematic hardware configuration diagram of a chatter vibration determination device according to one embodiment.

FIG. 1 is a schematic hardware configuration diagram showing principal parts of a chatter vibration determination device according to one embodiment. A chatter vibration determination device 1 can be implemented as, for example, a control device for controlling a machine tool. Also, the chatter vibration determination device 1 can be implemented as a computer, such as a personal computer attached to a control device for controlling a machine tool, an edge computer connected to a control device through a wired/wireless network, a fog computer, or a cloud server. In the illustrated example of the present embodiment, the chatter vibration determination device 1 is implemented as a control device for controlling a machine tool.

A CPU 11 of the chatter vibration determination device 1 according to the present embodiment is a processor for generally controlling the chatter vibration determination device 1. The CPU 11 reads out a system program stored in a ROM 12 via a bus 21 and controls the entire chatter vibration determination device 1 according to this system program. A RAM 13 is temporarily loaded with temporary calculation data and display data, various data input through an input unit (not shown) by an operator, and the like.

A non-volatile memory 14 is composed of, for example, a memory, SSD (solid state drive), or the like backed up by a battery (not shown) so that its storage state can be maintained even when the chatter vibration determination device 1 is switched off. The non-volatile memory 14 is stored with programs read from external equipment 72 through an interface 15, program input through a display/MDI unit 70, various data (e.g., position, speed, and acceleration of each servomotor 50, rotational speed of the spindle motor 62, current values of the individual motors, etc.) acquired from various parts of the chatter vibration determination device 1 and the machine tool, detected value (chatter vibration generated in the machine tool) detected by a sensor 3, and the like. The programs and the various data stored in the non-volatile memory 14 may be developed in the RAM 13 during execution and use. Moreover, various system programs (including a system program for controlling exchange with a machine learning device 100 (described later)), such as a conventional analysis program, are previously written in the ROM 12.

The interface 15 is an interface for connecting the chatter vibration determination device 1 and the external equipment 72 including an adapter. A program, various parameters, and the like are read from the side of the external equipment 72. Moreover, the program, the various parameters, and the like edited in the chatter vibration determination device 1 can be stored into an external storage means through the external equipment 72. A PMC (programmable machine controller) 16 controls the machine tool and its peripheral devices by outputting signals to them through an I/O unit 17 according to a sequence program built in the chatter vibration determination device 1. Furthermore, on receiving signals from various switches on a control panel on the main body of the machine tool and the like, the PMC 16 performs necessary signal processing and then delivers the signals to the CPU 11.

The display/MDI unit 70 is a manual data input device equipped with a display, keyboard, and the like. An interface 18 receives commands and data from the keyboard of the display/MDI unit 70 and delivers them to the CPU 11. An interface 19 is connected to a control panel 71 equipped with a manual pulse generator or the like used to manually drive individual axes.

An axis control circuit 30 for controlling the axis of the machine tool receives a movement command amount for each axis from the CPU 11 and outputs a command for the axis to a servo amplifier 40. On receiving this command, the servo amplifier 40 drives a servomotor 50 for moving the axes of the machine tool. The axis servomotor 50 has a position/speed detector built-in. A position/speed feedback signal from this position/speed detector is fed back to the axis control circuit 30, and the axis control circuit 30 performs position/speed feedback control. In the hardware configuration diagram of FIG. 1, the axis control circuit 30, servo amplifier 40, and servomotor 50 are each shown as being only one in number. Actually, however, these elements are provided corresponding in number to the axes of the machine tool to be controlled.

On receiving a spindle rotation command for a spindle attached to the machine tool from the CPU 11, a spindle control circuit 60 outputs a spindle speed signal to a spindle amplifier 61. On receiving this spindle speed signal, the spindle amplifier 61 rotates a spindle motor 62 for the spindle at a commanded rotational speed. The spindle motor 62 is connected with a position coder 63. The position coder 63 outputs feedback pulses in synchronism with the rotation of the spindle, and these feedback pulses are read by the CPU 11.

The sensor 3 is a vibration sensor such as an acceleration sensor or displacement sensor and is used to detect chatter vibration generated in the machine tool. The chatter vibration in the machine tool detected by the sensor 3 is delivered to the CPU 11 via the bus 20. The sensor 3 is used for learning by the machine learning device 100 and may be removed from the chatter vibration determination device 1 after the learning by the machine learning device 100 is completed.

An interface 22 is an interface for connecting the chatter vibration determination device 1 and the machine learning device 100. The machine learning device 100 comprises a processor 101 configured to control the entire machine learning device 100, a ROM 102 stored with system programs, a RAM 103 for temporary storage in each step of processing related to machine learning, and a non-volatile memory 104 used to store learning models. The machine learning device 100 can observe pieces of information (e.g., position, speed, and acceleration of each servomotor 50, rotational speed of the spindle motor 62, current values of the individual motors, detected value of chatter vibration generated in the machine tool, etc.) acquirable through the interface 22 by the chatter vibration determination device 1. Moreover, on receiving the estimation result of adjustment of a machining condition or conditions of the machine tool liable to reduce the chatter vibration, which are output from the machine learning device 100, the chatter vibration determination device 1 executes processing (automatic adjustment, presentation of the estimation result to a worker, etc.) related to the adjustment of the machining condition(s) of the machine tool based on this estimation result.

Figure 2:
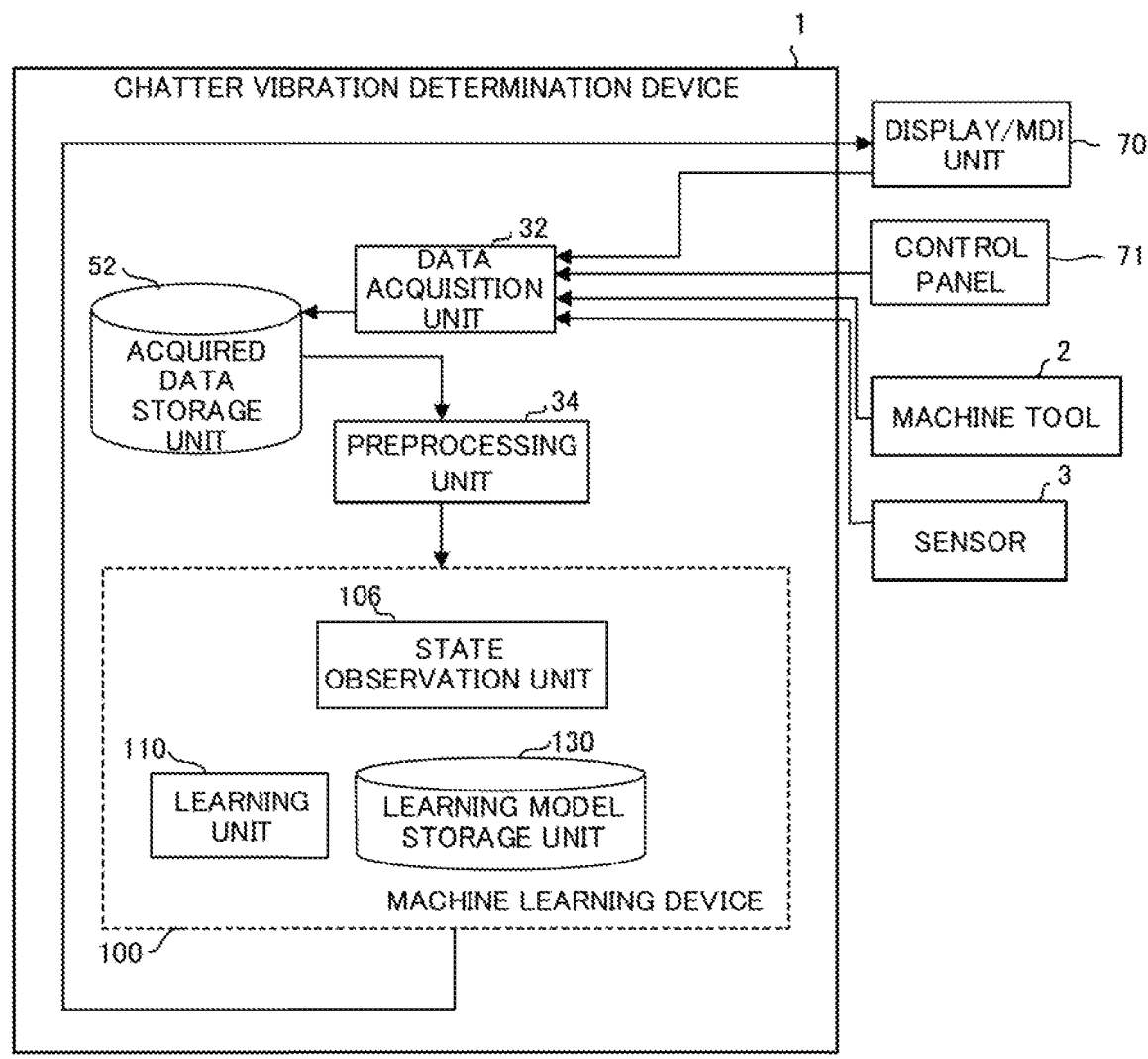
FIG. 2 is a schematic functional block diagram of a chatter vibration determination device according to a first embodiment.

FIG. 2 is a schematic functional block diagram of a chatter vibration determination device 1 and a machine learning device 100 according to a first embodiment. The chatter vibration determination device 1 of the present embodiment has a configuration required when the machine learning device 100 performs unsupervised learning (learning mode). Each functional block shown in FIG. 2 is implemented as the CPU 11 of the chatter vibration determination device 1 and the processor 101 of the machine learning device 100 shown in FIG. 1 execute their respective system programs and control the operation of each part of the chatter vibration determination device 1 and the machine learning device 100.

The chatter vibration determination device 1 of the present embodiment comprises a data acquisition unit 32 and a preprocessing unit 34. The machine learning device 100 of the chatter vibration determination device 1 comprises a state observation unit 106 and a learning unit 110. Moreover, an acquired data storage unit 52 stored with data acquired from a machine tool 2 and a sensor 3 is provided on a non-volatile memory 14. A learning model storage unit 130 configured to store learning models constructed by machine learning by the learning unit 110 is provided on the non-volatile memory 104 of the machine learning device 100.

The data acquisition unit 32 acquires data related to workpiece machining by the machine tool 2 from the machine tool, the sensor 3, and the like. The data acquisition unit 32 acquires, for example, the position, speed, and acceleration of each servomotor 50, rotational speed of a spindle motor 62, current values of the individual motors, detected value of chatter vibration generated in the machine tool, and the like, from the machine tool 2, the sensor 3, and the like, and stores them as acquired data into the acquired data storage unit 52.

The preprocessing unit 34 creates learning data to be used for machine learning by the machine learning device 100, based on the data acquired by the data acquisition unit 32 (and stored in the acquired data storage unit 52). The preprocessing unit 34 creates learning data obtained by converting (by digitalization or sampling), among the data acquired by the data acquisition unit 32, those data which are acquired when the detected value of chatter vibration of the machine tool 2 is not higher than a predetermined threshold (or not higher than a value at which chatter vibration is not regarded as being generated) into a unified form dealt with in the machine learning device 100. For example, if the machine learning device 100 performs unsupervised learning, the preprocessing unit 34 creates state data S of a predetermined format in the unsupervised learning as learning data. The state data S created by the preprocessing unit 34 include at least one machining condition data S1 that includes machining conditions such as a feed speed, spindle rotational speed, and the like commanded in the control of the machine tool 2.

The machining condition data S1 may be such data that the value of a predetermined machining condition set in the RAM 13 or the non-volatile memory 14 of the chatter vibration determination device 1 as a control device and the value of a machining condition commanded according to a control program used for the control of the machine tool 2 are applied to a predetermined specified data array. Also, other machining conditions such as the depth of cut may be included in the machining condition data S1.

The state observation unit 106 observes the learning data created by the preprocessing unit 34 and delivers the state data S included in the learning data concerned to the learning unit 110.

The learning unit 110 performs machine learning using the learning data created by the preprocessing unit 34 and observed by the state observation unit 106. As an example of the machine learning by the learning unit 110, there is a conventional unsupervised learning method using the learning data created by the preprocessing unit 34, based on data acquired when the detected value of the chatter vibration of the machine tool 2 is not higher than a predetermined threshold. By this learning method, a learning model is generated such that the relationship between a machining condition and the state of occurrence of chatter vibration in the machining operation of the machine tool 2 is machine-learned, and the generated learning model is stored into the learning model storage unit 130. The autoencoder method, k-means method, and the like can be given as examples of the unsupervised learning method performed by the learning unit 110.

Figure 3:
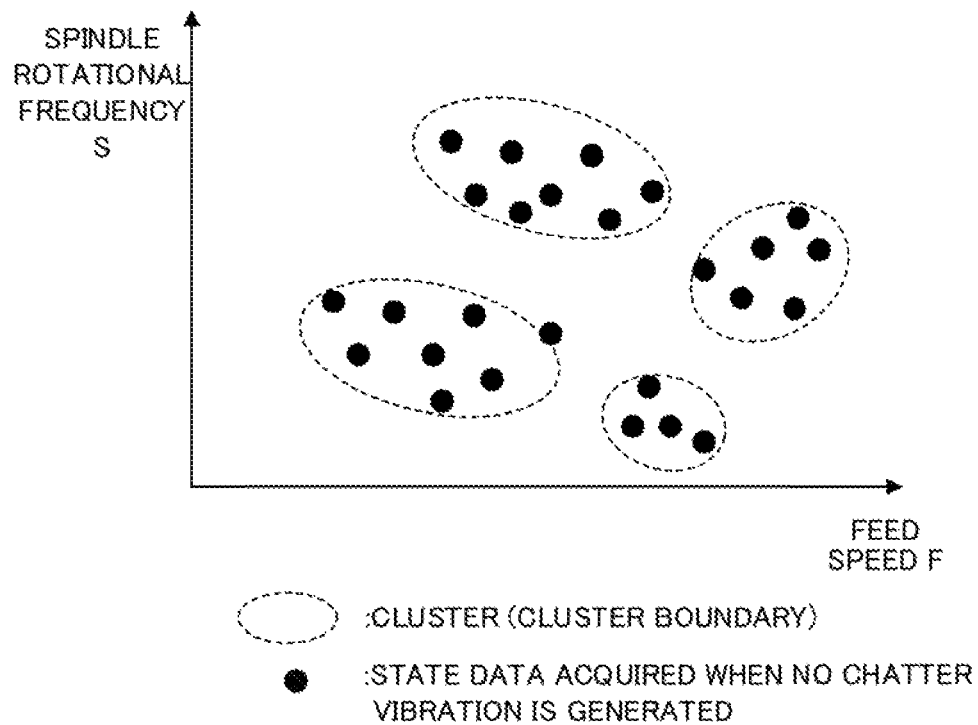
FIG. 3 is a diagram showing an example of a learning model generated by unsupervised learning.

FIG. 3 is a diagram showing an example of a learning model created by unsupervised learning, based on the data acquired when the detected value of the chatter vibration of the machine tool 2 is not higher than a predetermined threshold. For ease of explanation, FIG. 3 shows a learning model for the case in which the state data S include only the spindle rotational speed and the feed speed of one feed axis. However, actual state data S are represented by a vector space of a higher dimension (e.g., including the values of various machining conditions as elements), and the generated learning model indicates a data distribution state in a multidimensional space. In the present embodiment, as illustrated in FIG. 3, the learning model generated by the learning unit 110 is generated as a distribution of a set (cluster) of state data S. If the learning model generated in this manner is used, a determination unit 120 and an analysis unit 140 (described later) estimate the occurrence/non-occurrence of chatter vibration and a machining condition for the improvement of this chatter vibration, depending on the relationship between data newly acquired from the machine tool 2 and the distribution of the data acquired when the detected value of the chatter vibration is not higher than a predetermined threshold.

In the chatter vibration determination device 1 having the above configuration, the learning unit 110 creates the learning model by performing the machine learning using the learning data created by the preprocessing unit 34, based on the data acquired from the machine tool 2 and the sensor 3. The learning model created in this manner can be used to estimate the occurrence/non-occurrence of chatter vibration and an improvement plan for the chatter vibration, based on data such as the machining condition acquired from the machine tool 2, when the worker newly performs machining with the machine tool 2.

Figure 4:
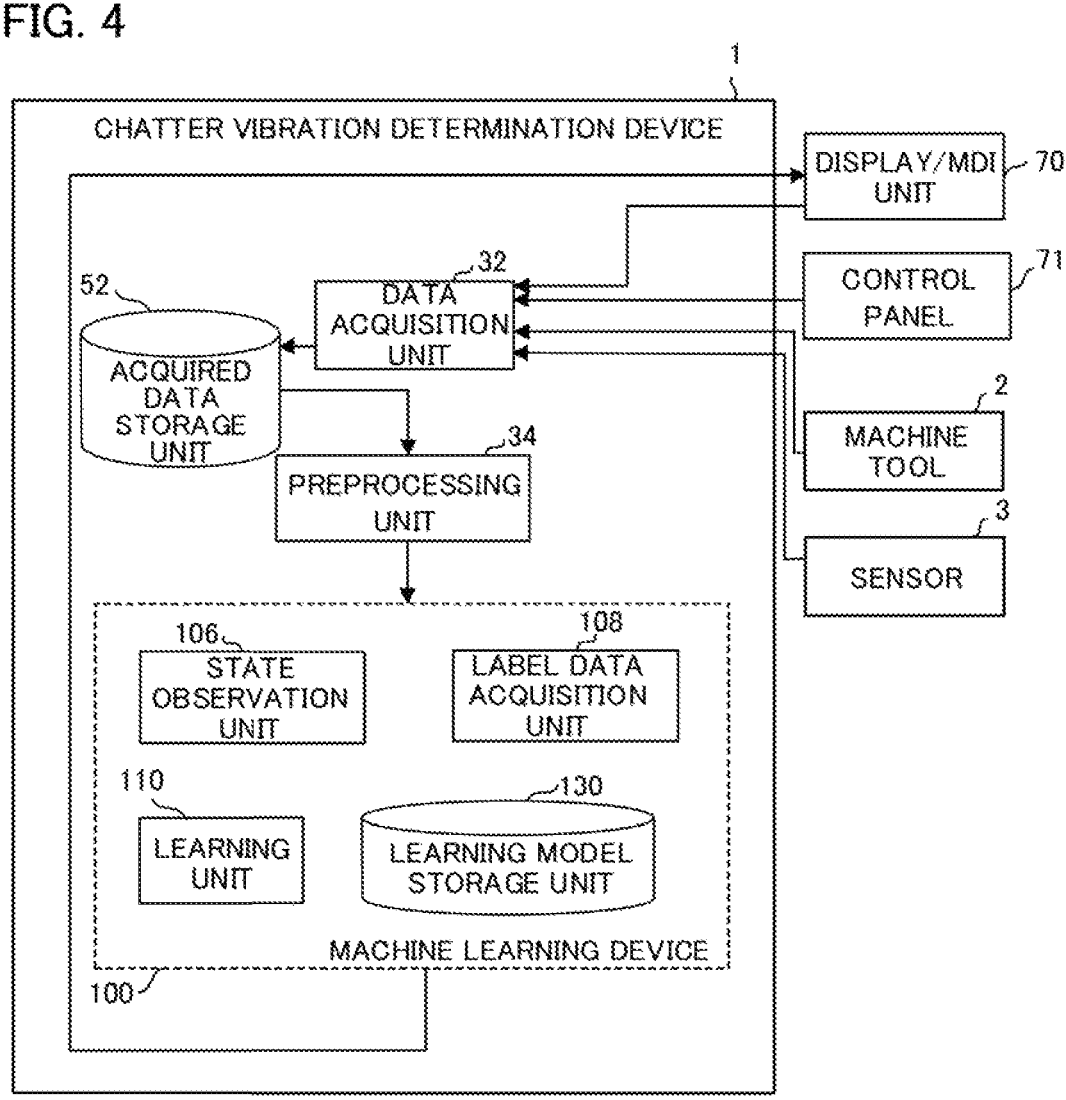
FIG. 4 is a schematic functional block diagram of a chatter vibration determination device according to a second embodiment.

FIG. 4 is a schematic functional block diagram of a chatter vibration determination device 1 and a machine learning device 100 according to a second embodiment. The chatter vibration determination device 1 of the present embodiment has a configuration required when the machine learning device 100 performs supervised learning (learning mode). Each functional block shown in FIG. 4 is implemented as the CPU 11 of the chatter vibration determination device 1 and the processor 101 of the machine learning device 100 shown in FIG. 1 execute their respective system programs and control the operation of each part of the chatter vibration determination device 1 and the machine learning device 100.

The chatter vibration determination device 1 of the present embodiment comprises a data acquisition unit 32 and a preprocessing unit 34. The machine learning device 100 of the chatter vibration determination device 1 comprises a state observation unit 106, label data acquisition unit 108, and learning unit 110. Moreover, an acquired data storage unit 52 stored with data acquired from a machine tool 2 and a sensor 3 is provided on a non-volatile memory 14. A learning model storage unit 130 configured to store learning models constructed by machine learning by the learning unit 110 is provided on the non-volatile memory 104 of the machine learning device 100.

The data acquisition unit 32 according to the present embodiment shares the same function with the data acquisition unit 32 according to the first embodiment.

The preprocessing unit 34 according to the present embodiment creates learning data to be used for machine learning by the machine learning device 100, based on the data acquired by the data acquisition unit 32 (and stored in the acquired data storage unit 52). The preprocessing unit 34 creates learning data obtained by converting (by digitalization or sampling) the data acquired by the data acquisition unit 32 into a unified form dealt with in the machine learning device 100. For example, if the machine learning device 100 performs supervised learning, the preprocessing unit 34 creates a set of state data S and label data L of a predetermined format in the supervised learning as learning data. As in the first embodiment, the state data S created by the preprocessing unit 34 include at least one machining condition data S1 that includes machining conditions such as a feed speed, spindle rotational speed, and the like commanded in the control of the machine tool 2. Moreover, the label data L created by the preprocessing unit 34 include at least chatter vibration data L1 indicative of the detected value of chatter vibration detected during the machining operation of the machine tool 2.

For example, a vibration value detected by the sensor 3 as a vibration sensor, torque values measured by a servomotor 50 for driving each part of the machine tool 2 and a spindle motor 62, and vibration values estimated from the values of currents supplied to the to the servomotor 50 and the spindle motor 62 may be used for the chatter vibration data L1.

The state observation unit 106 observes the learning data created by the preprocessing unit 34 and delivers the state data S included in the learning data concerned to the learning unit 110.

The label data acquisition unit 108 observes the learning data created by the preprocessing unit 34 and delivers the label data L included in the learning data concerned to the learning unit 110. The learning unit 110 performs machine learning using the learning data created by the preprocessing unit 34. As an example of the machine learning by the learning unit 110, there is a conventional supervised learning method using the learning data created by the preprocessing unit 34, based on data acquired during the machining operation of the machine tool 2. By this learning method, a learning model is generated such that the relationship between a machining condition and the detected value of chatter vibration in the machining operation of the machine tool 2 is machine-learned, and the generated learning model is stored into the learning model storage unit 130. The multilayer perceptron method, recurrent neural network method, Long Short-Term Memory method, convolutional neural network method, and the like can be given as examples of the supervised learning method performed by the learning unit 110.

Figure 5:
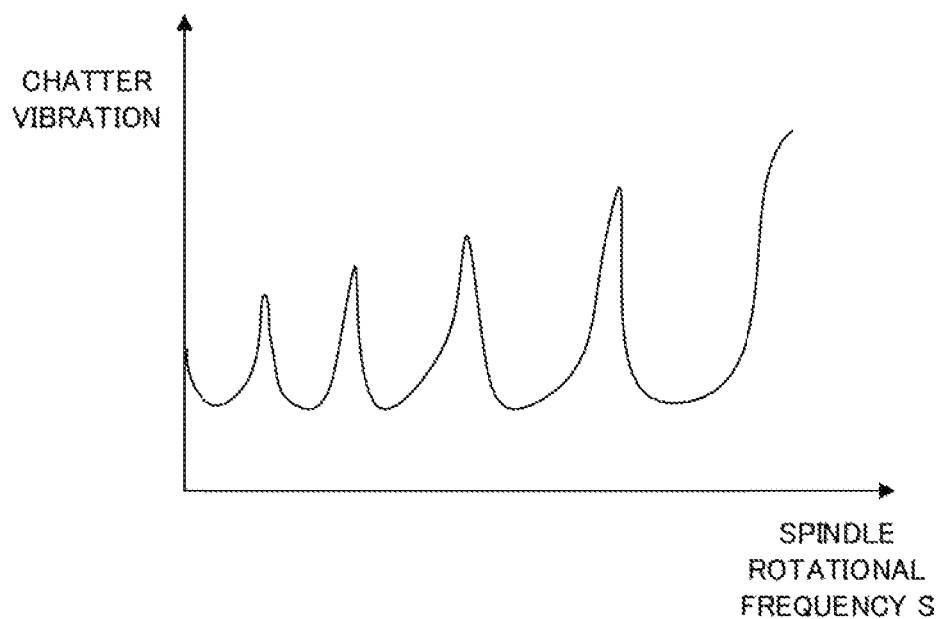
FIG. 5 is a diagram showing an example of a learning model generated by supervised learning.

FIG. 5 is a diagram showing an example of a learning model created by supervised learning, based on data acquired during the machining operation of the machine tool 2. For ease of explanation, FIG. 5 shows a learning model for the case in which the state data S include the spindle rotational speed and the label data L include the detected value of chatter vibration. However, actual state data S are represented by a vector space of a higher dimension (e.g., including the values of a plurality of other machining conditions as elements), and the generated learning model indicates a specified graph in a multidimensional space. If the learning model generated in this manner is used, a determination unit 120 and an analysis unit 140 (described later) estimate the degree of chatter vibration and a machining condition for the improvement of this chatter vibration by inputting data newly acquired from the machine tool 2 to the learning model.

As a modification of the chatter vibration determination devices 1 according to the first and second embodiments, the preprocessing unit 34 may be configured to further create tool data S2 including information on tools, in addition to the machining condition data S1, as the state data S. The tool data S2 may be created using information set on a memory of the chatter vibration determination device 1 as a control device or created based on information input through a display/MDI unit 70 by the worker or information acquired from some other computer, such as a CAD/CAM device, through a network (not shown). The tool data S2 may include the tool type, number of tool blades, tool material, and the like.

By using the tool data S2 as the state data S, the chatter vibration determination device 1 can machine-learn the relationship of the machining condition and the tool with the detected value of chatter vibration in the machining operation of the machine tool 2.

As another modification of the chatter vibration determination devices 1 according to the first and second embodiments, the preprocessing unit 34 may be configured to further create workpiece data S3 including information on workpieces, in addition to the machining condition data S1, as the state data S. The workpiece data S3 may be created using information set on the memory of the chatter vibration determination device 1 as a control device or created based on information input through the display/MDI unit 70 by the worker or information acquired from some other computer, such as the CAD/CAM device, through the network (not shown). The workpiece data S3 may include the workpiece material and the like.

By using the workpiece data S3 as the state data S, the chatter vibration determination device 1 can machine-learn the relationship of the machining condition and the workpiece with the detected value of chatter vibration in the machining operation of the machine tool 2.

Figure 6:
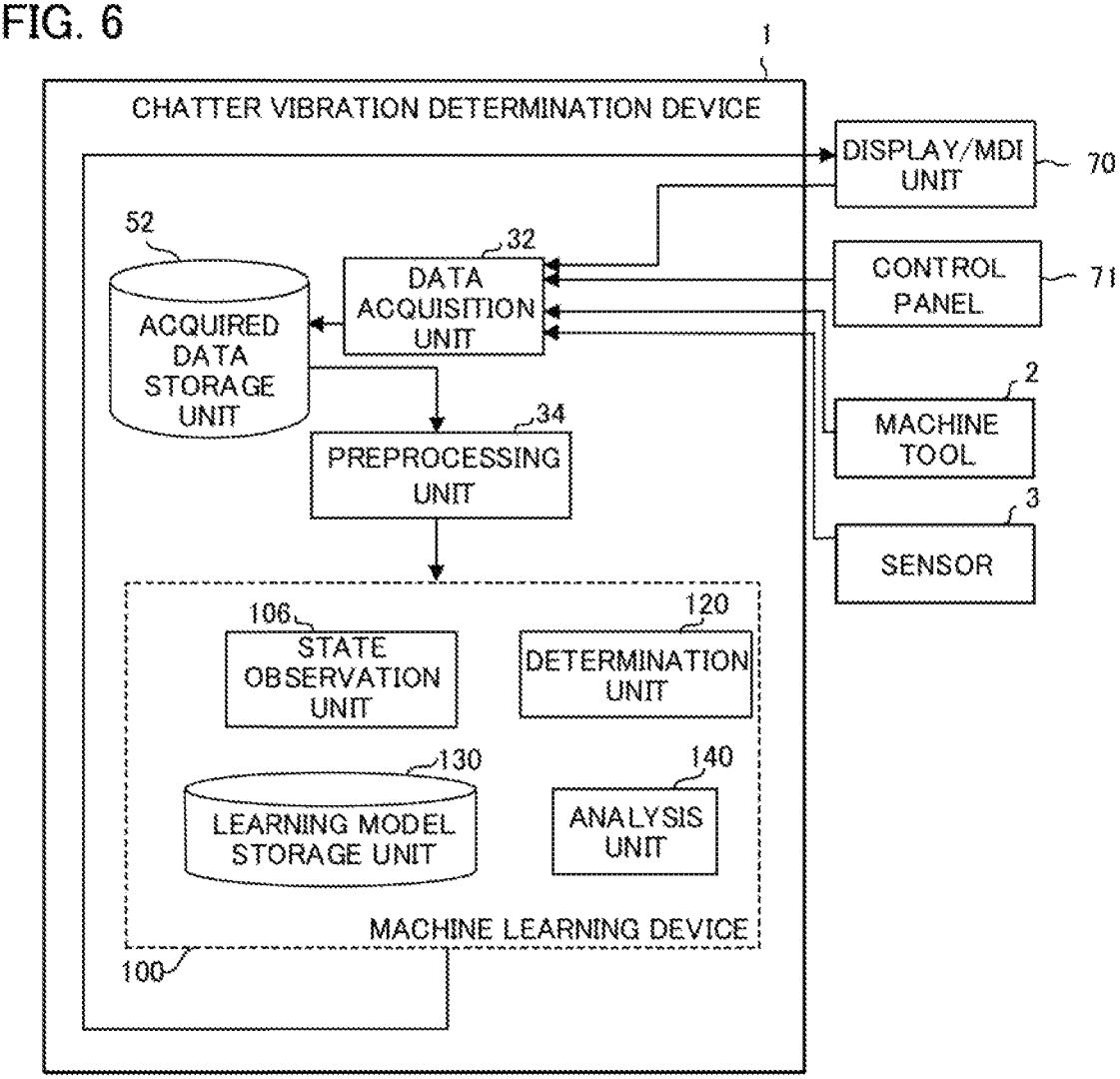
FIG. 6 is a schematic functional block diagram of a chatter vibration determination device according to a third embodiment.

FIG. 6 is a schematic functional block diagram of a chatter vibration determination device 1 and a machine learning device 100 according to a third embodiment. The chatter vibration determination device 1 of the present embodiment has a configuration required when the machine learning device 100 performs estimation processing using a learning model created by unsupervised learning (estimation mode). Each functional block shown in FIG. 6 is implemented as the CPU 11 of the chatter vibration determination device 1 and the processor 101 of the machine learning device 100 shown in FIG. 1 execute their respective system programs and control the operation of each part of the chatter vibration determination device 1 and the machine learning device 100.

The chatter vibration determination device 1 of the present embodiment comprises a data acquisition unit 32 and a preprocessing unit 34. The machine learning device 100 of the chatter vibration determination device 1 comprises a state observation unit 106, determination unit 120, and analysis unit 140. Moreover, an acquired data storage unit 52 stored with data acquired from a machine tool 2 and a sensor 3 is provided on a non-volatile memory 14. A learning model storage unit 130 configured to store learning models constructed by machine learning by a learning unit 110 is provided on a non-volatile memory 104 of the machine learning device 100.

The data acquisition unit 32 and the state observation unit 106 according to the present embodiment share the same functions with the data acquisition unit 32 and the state observation unit 106 according to the first embodiment. Moreover, the preprocessing unit 34 according to the present embodiment shares the same function as the preprocessing unit 34 according to the first embodiment except that the created learning data is used for the estimation by the machine learning device 100.

The determination unit 120 estimates the occurrence/non-occurrence of chatter vibration in the machining by the machine tool 2 using the learning models stored in the learning model storage unit 130, based on the state data S created by the preprocessing unit 34. The determination unit 120 of the present embodiment estimates the occurrence/non-occurrence of chatter vibration in the machining by the machine tool 2 by analyzing the relationship between data newly acquired from the machine tool 2 and a learning model (distribution of data acquired when the detected value of chatter vibration is not higher than a predetermined threshold) generated (or for which a parameter is decided) by the learning unit 110.

If the occurrence of chatter vibration is estimated by the determination unit 120, the analysis unit 140 analyzes the state data S created by the preprocessing unit 34 and the learning models stored in the learning model storage unit 130 and estimates the improvement of the chatter vibration in the machining by the machine tool 2. The analysis unit 140 of the present embodiment estimates the improvement of the chatter vibration in the machining by the machine tool 2 by analyzing the relationship between the data newly acquired from the machine tool 2 and the learning model (distribution of the data acquired when the detected value of chatter vibration is not higher than the predetermined threshold) generated (or for which the parameter is decided) by the learning unit 110.

Figure 7:
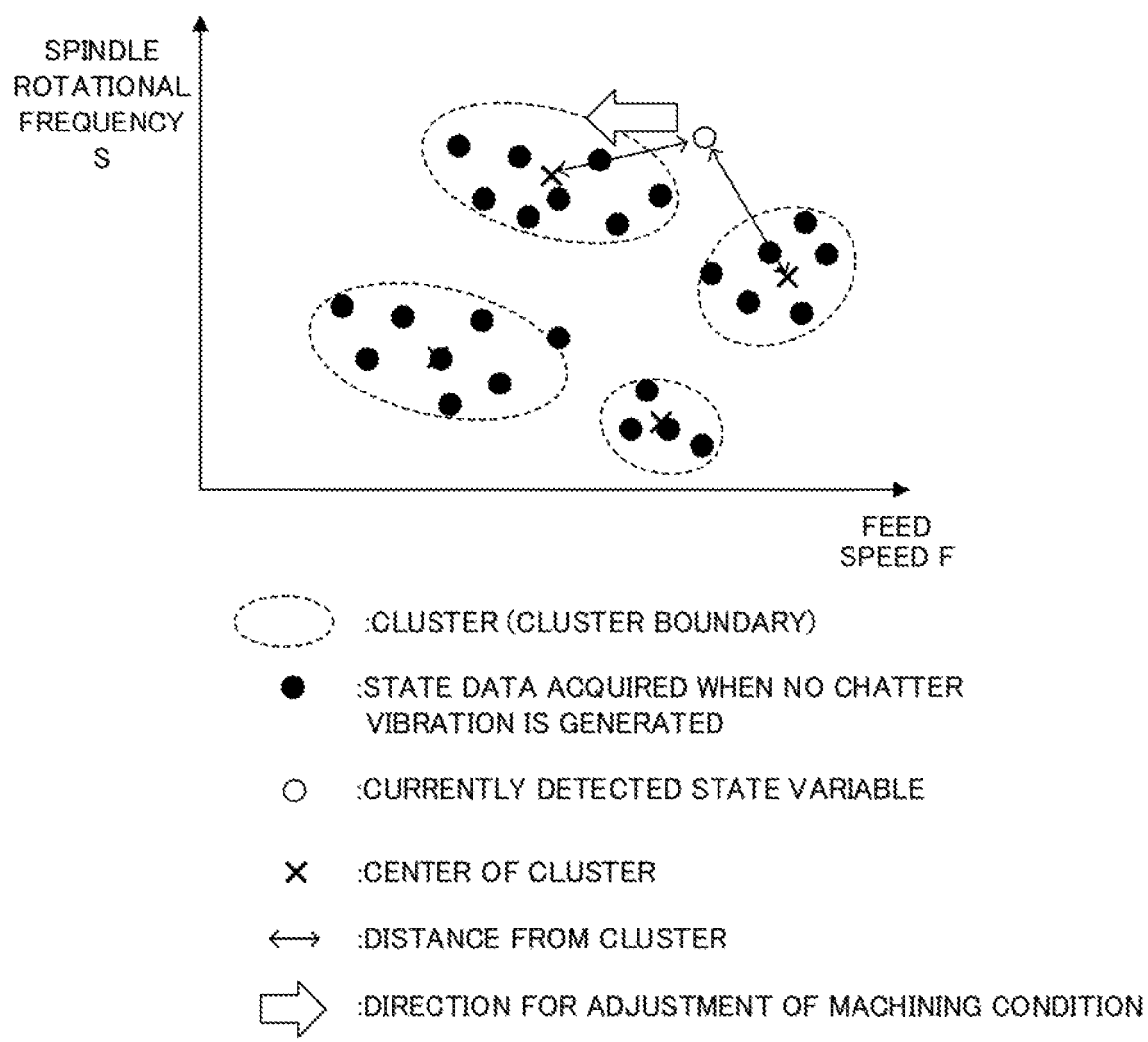
FIG. 7 is a diagram illustrating estimation of the occurrence/non-occurrence of chatter vibration and improvement of the chatter vibration using the learning model generated by unsupervised learning.

FIG. 7 is a diagram illustrating the estimation processing by the determination unit 120 and the analysis unit 140 for the occurrence/non-occurrence of chatter vibration and the improvement of the chatter vibration, based on the state data S acquired from the machine tool 2 and the learning model created by unsupervised learning. For ease of explanation, FIG. 7 illustrates the case in which the state data S include only the spindle rotational speed and the feed speed of one feed axis. However, actual state data S are represented by a vector space of a higher dimension (e.g., including the values of various machining conditions as elements), and the learning model indicates a data distribution state in a multidimensional space. The determination unit 120 according to the present embodiment estimates the occurrence/non-occurrence of chatter vibration by determining whether or not the state data S to be estimated belongs to a set (cluster) of state data S generated as the learning model according to a predetermined criterion. For example, as illustrated in FIG. 7, the determination unit 120 obtains the distance between the state data S to be estimated and the center of each cluster (or cluster boundary) of data generated as the learning model. The determination unit 120 may be configured to estimate that chatter vibration does not occur when the state data S to be estimated is within a predetermined specified threshold $Lth_1$ from some cluster and that chatter vibration occurs when the state data S to be estimated is beyond the predetermined specified threshold $Lth_1$ from any of the clusters. Moreover, the determination unit 120 may be configured, in executing the estimation processing, for example, to obtain the density of the data generated as the learning model in the position of the state data S to be estimated, for example, and to estimate that chatter vibration does not occur when this density is not lower than a predetermined specified threshold $Dth_1$ and that chatter vibration occurs when the density is lower than the specified threshold $Dth_1$.

On the other hand, the analysis unit 140 according to the present embodiment estimates the improvement of the chatter vibration by analyzing the machining condition to be adjusted in order to cause the state data S to be estimated to belong to some set (cluster) of state data S generated as the learning model. Moreover, the analysis unit 140 further analyzes the amount of adjustment of the machining condition required in order to cause the state data S to belong to the cluster.

For example, as illustrated in FIG. 7, the analysis unit 140 obtains the distances between the state data S to be estimated and the respective centers of the clusters of the data generated as the learning model, identifies the cluster located closest to the state data S to be estimated by comparing the obtained distances, and analyzes the machining condition to be adjusted in order to cause the state data S to belong to this cluster. In the example of FIG. 7, the state data S can be caused to belong to the nearby cluster by setting a machining condition for a feed speed F to a lower level, so that the feed speed F is estimated as the machining condition to be improved. Moreover, in the example of FIG. 7, the amount of adjustment of the feed speed required in order to make the distance from the cluster concerned not longer than a specified threshold is estimated as an amount of adjustment of the feed speed F for the improvement of the chatter vibration. The analysis unit 140 may be configured to estimate a plurality of machining conditions as machining conditions to be improved.

The result of estimation of the occurrence/non-occurrence of chatter vibration and the improvement of this chatter vibration by the determination unit 120 and the analysis unit 140 may be used for the adjustment of the machining condition in the machining by the machine tool 2, for example. In this case, if it is determined by the determination unit 120 that chatter vibration occurs under the currently set machining condition, the chatter vibration determination device 1 automatically adjusts the currently set machining condition so that the chatter vibration is reduced, based on the result of estimation of the improvement of the chatter vibration by the analysis unit 140. Since this automatic adjustment is based on the currently set machining condition, the chatter vibration can be reduced by a minimal change, without excessively changing the machining condition set according to the current purpose of machining.

Moreover, the result of estimation of the occurrence/non-occurrence of chatter vibration and the improvement of this chatter vibration by the determination unit 120 and the analysis unit 140 may be displayed as guidance for a display/MDI unit 70, for example. Watching this display, the worker can ascertain the occurrence/non-occurrence of chatter vibration under the current machining condition, and if chatter vibration occurs, he/she can easily ascertain the machining condition to be adjusted to suppress the chatter vibration and the way of the adjustment.

Figure 8:
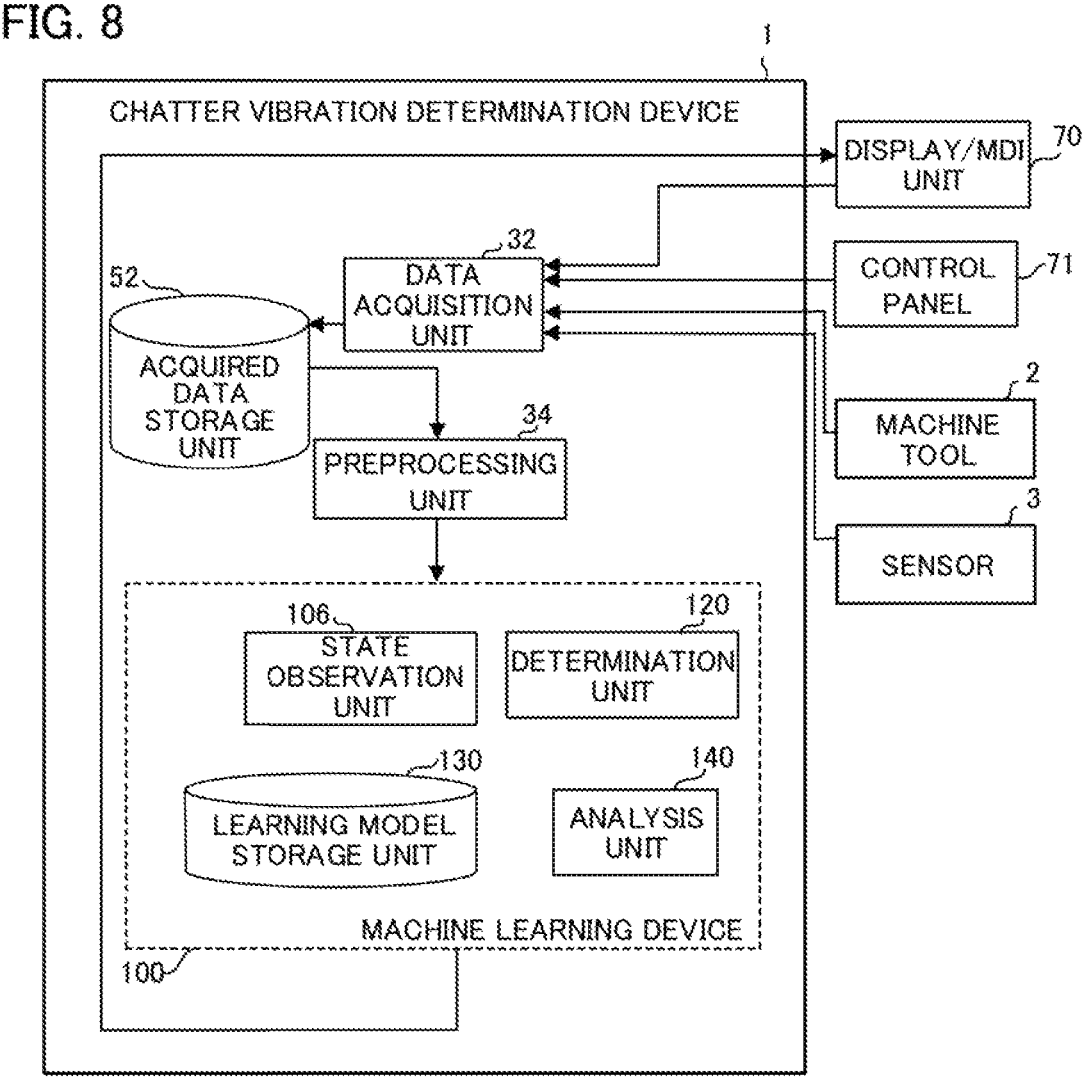
FIG. 8 is a schematic functional block diagram of a chatter vibration determination device according to a fourth embodiment.

FIG. 8 is a schematic functional block diagram of a chatter vibration determination device 1 and a machine learning device 100 according to a fourth embodiment. The chatter vibration determination device 1 of the present embodiment has a configuration required when the machine learning device 100 performs estimation processing using a learning model created by supervised learning (estimation mode). Each functional block shown in FIG. 8 is implemented as the CPU 11 of the chatter vibration determination device 1 and the processor 101 of the machine learning device 100 shown in FIG. 1 execute their respective system programs and control the operation of each part of the chatter vibration determination device 1 and the machine learning device 100.

The chatter vibration determination device 1 of the present embodiment comprises a data acquisition unit 32 and a preprocessing unit 34. The machine learning device 100 of the chatter vibration determination device 1 comprises a state observation unit 106, determination unit 120, and analysis unit 140. Moreover, an acquired data storage unit 52 stored with data acquired from a machine tool 2 and a sensor 3 is provided on a non-volatile memory 14. A learning model storage unit 130 configured to store learning models constructed by machine learning by a learning unit 110 is provided on a non-volatile memory 104 of the machine learning device 100.

The data acquisition unit 32 and the state observation unit 106 according to the present embodiment share the same functions with the data acquisition unit 32 and the state observation unit 106 according to the second embodiment. Moreover, the preprocessing unit 34 according to the present embodiment shares the same function as the preprocessing unit 34 according to the second embodiment except that learning data including the state data S are created for the estimation processing by the machine learning device 100.

The determination unit 120 estimates the occurrence/non-occurrence of chatter vibration in the machining by the machine tool 2 using the learning models stored in the learning model storage unit 130, based on the state data S created by the preprocessing unit 34. The determination unit 120 of the present embodiment inputs data newly acquired from the machine tool 2 to a learning model generated (or for which a parameter is decided) by the learning unit 110, thereby acquiring the result of estimation of the degree of chatter vibration in the machining by the machine tool 2, and estimates the occurrence/non-occurrence of chatter vibration based on this result of estimation.

If the occurrence of chatter vibration is estimated by the determination unit 120, the analysis unit 140 analyzes the state data S created by the preprocessing unit 34 and the learning models stored in the learning model storage unit 130 and estimates the improvement of the chatter vibration in the machining by the machine tool 2. The analysis unit 140 of the present embodiment estimates the improvement of the chatter vibration in the machining by the machine tool 2 by analyzing the relationship between the data newly acquired from the machine tool 2 and the learning model generated (or for which the parameter is decided) by the learning unit 110.

Figure 9:
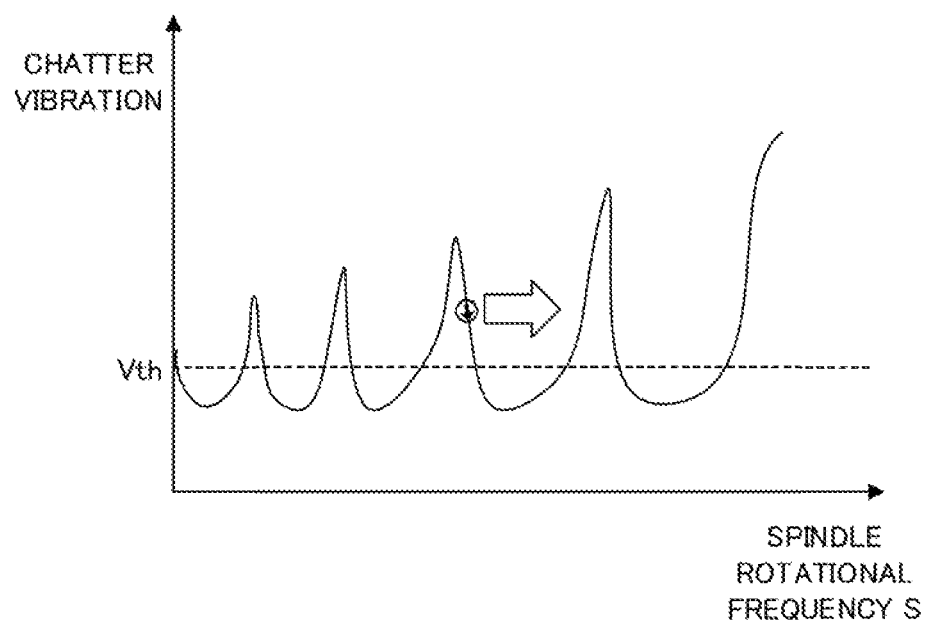
FIG. 9 is a diagram illustrating estimation of the occurrence/non-occurrence of chatter vibration and improvement of the chatter vibration using the learning model generated by supervised learning.

FIG. 9 is a diagram illustrating the estimation processing by the determination unit 120 and the analysis unit 140 for the occurrence/non-occurrence of chatter vibration and the improvement of the chatter vibration, based on the state data S acquired from the machine tool 2 and the learning model created by supervised learning. For ease of explanation, FIG. 9 illustrates the case in which the state data S include the spindle rotational speed and the label data L include the detected value of chatter vibration. However, actual state data S are represented by a vector space of a higher dimension (e.g., including the values of a plurality of other machining conditions as elements), and the generated learning model indicates a specified graph in a multidimensional space. The determination unit 120 of the present embodiment estimates the occurrence/non-occurrence of chatter vibration by inputting the state data S to be estimated to a learning model and determining whether or not a predetermined criterion is exceeded by the amount of estimation of the degree of chatter vibration output from this learning model. For example, as illustrated in FIG. 9, the determination unit 120 may be configured to obtain an estimated value of the degree of chatter vibration by inputting the state data S to be estimated to the learning model, and to estimate that chatter vibration does not occur when the estimated value of the degree of chatter vibration is not higher than a predetermined specified threshold Vth and that chatter vibration occurs when the predetermined specified threshold Vth is exceeded.

On the other hand, the analysis unit 140 according to the present embodiment estimates the improvement of the chatter vibration by analyzing the machining condition to be adjusted in order to make the estimated value of the degree of chatter vibration obtained by the input to the learning model not higher than the specified threshold Vth. Moreover, the analysis unit 140 further analyzes the amount of adjustment of the machining condition required in order to make the estimated value of the degree of chatter vibration not higher than the specified threshold Vth. For example, the analysis unit 140 may be configured to analyze the changing trend of the degree of chatter vibration for each machining condition in the position of the state data S on the learning model and to estimate the machining condition with the highest changing trend of the degree of chatter vibration as the machining condition to be adjusted. In such a case, if a learning model is modeled by a specified function, it is necessary only that the analysis unit 140 create a function for each of machining conditions $c_i$ (i=1~n) such that other machining conditions for learning models are fixed to values indicated by the state data S and obtain an inclination in a position of the state data S for the function concerned, and that this inclination be regarded as the changing trend of the degree of chatter vibration in the position of the state data S on the learning model for the machining condition $c_i$. Furthermore, if the learning model is modeled by a neural network or the like, it is necessary only that the analysis unit 140 analyze a change of the degree of chatter vibration for each of the individual machining conditions $c_i$ (i=1~n) when the machining condition $c_i$ is changed from the position of the state data S with every predetermined specified variation $\Delta d_i$, and that this change be regarded as the changing trend of the degree of chatter vibration in the position of the state data S on the learning model for the machining condition $c_i$.

Furthermore, the analysis unit 140 estimates the amount of adjustment of the machining condition to be adjusted to make the degree of chatter vibration output by the learning model not higher than the specified threshold Vth, as the amount of adjustment of the machining condition for the improvement of the chatter vibration. The analysis unit 140 may be configured to estimate a plurality of machining conditions as machining conditions to be improved.

The result of estimation of the occurrence/non-occurrence of chatter vibration and the improvement of this chatter vibration by the determination unit 120 and the analysis unit 140 may be used for the adjustment of the machining condition in the machining by the machine tool 2, for example. In this case, if it is determined by the determination unit 120 that chatter vibration occurs under the currently set machining condition, the chatter vibration determination device 1 automatically adjusts the currently set machining condition so that the chatter vibration is reduced, based on the result of estimation of the improvement of the chatter vibration by the analysis unit 140. Since this automatic adjustment is based on the currently set machining condition, the chatter vibration can be reduced by a minimal change, without excessively changing the machining condition set according to the current purpose of machining.

Moreover, the result of estimation of the occurrence/non-occurrence of chatter vibration and the improvement of this chatter vibration by the determination unit 120 and the analysis unit 140 may be displayed as guidance for a display/MDI unit 70, for example. Watching this display, the worker can ascertain the occurrence/non-occurrence of chatter vibration under the current machining condition, and if chatter vibration occurs, he/she can easily ascertain the machining condition to be adjusted to suppress the chatter vibration and the way of the adjustment.

As a modification of the chatter vibration determination devices 1 according to the third and fourth embodiments, the analysis unit 140 may be configured to estimate the improvement of chatter vibration under a restriction on the adjustment related to the machining condition by the worker after this restriction is set in advance. In the machining by the machine tool 2, the worker sometimes does not want to reduce the feed speed or the spindle rotational frequency. In such a case, those machining conditions which are not desired to be adjusted may be set in advance so that the analysis unit 140 can estimate the machining condition to be adjusted while satisfying the restriction or request in estimating the improvement of chatter vibration.

Figure 10:
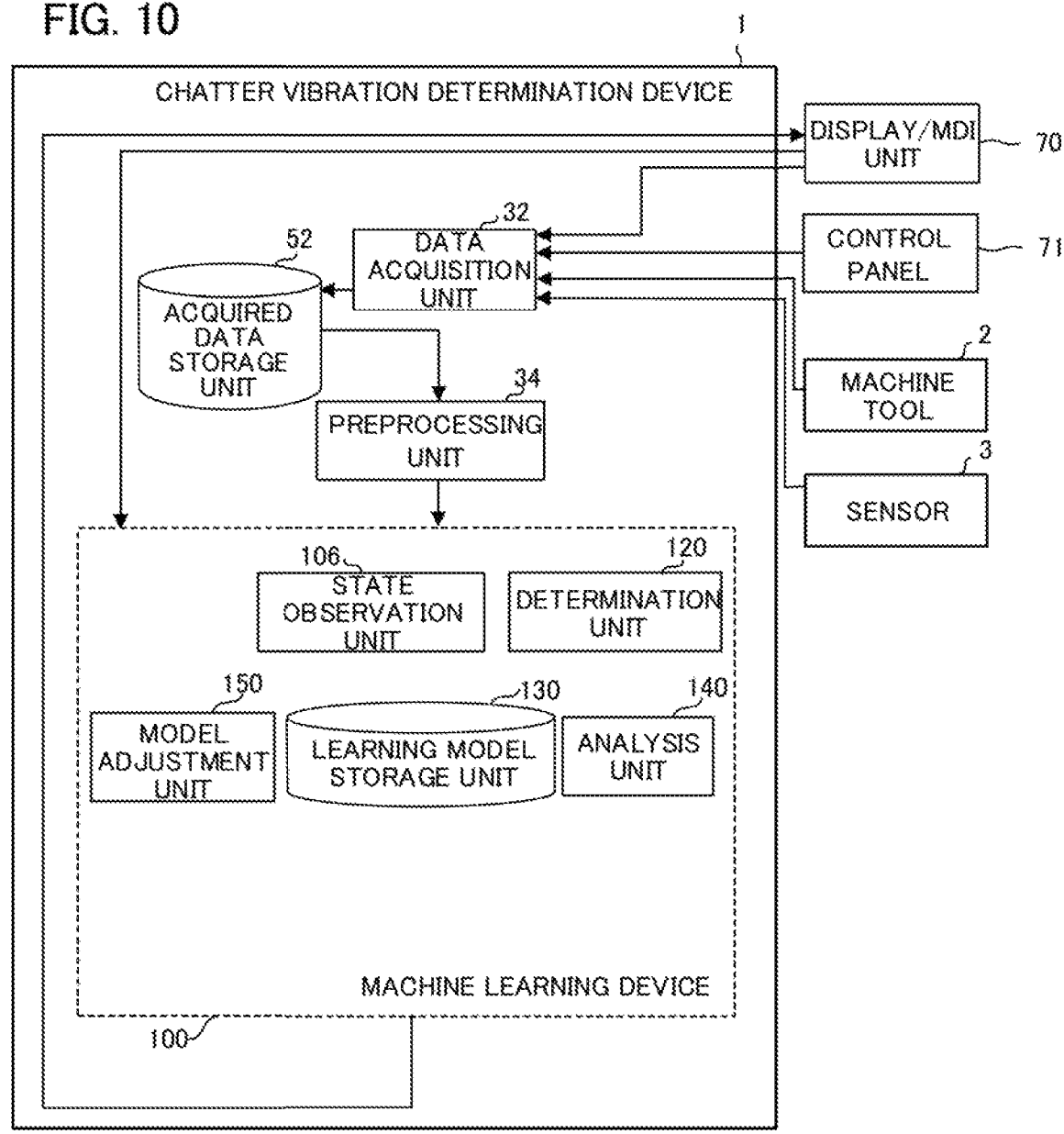
FIG. 10 is a schematic functional block diagram of the chatter vibration determination device according to the third embodiment.

FIG. 10 is a schematic functional block diagram of a chatter vibration determination device 1 and a machine learning device 100 according to a fifth embodiment. The chatter vibration determination device 1 of the present embodiment has a configuration required when the machine learning device 100 performs estimation processing using a learning model created by unsupervised learning (estimation mode). Each functional block shown in FIG. 10 is implemented as the CPU 11 of the chatter vibration determination device 1 and the processor 101 of the machine learning device 100 shown in FIG. 1 execute their respective system programs and control the operation of each part of the chatter vibration determination device 1 and the machine learning device 100.

The chatter vibration determination device 1 of the present embodiment comprises a data acquisition unit 32 and a preprocessing unit 34. The machine learning device 100 of the chatter vibration determination device 1 comprises a state observation unit 106, determination unit 120, analysis unit 140, and learning model adjustment unit 150. Moreover, an acquired data storage unit 52 stored with data acquired from a machine tool 2 and a sensor 3 is provided on a non-volatile memory 14. A learning model storage unit 130 configured to store learning models constructed by machine learning by a learning unit 110 is provided on a non-volatile memory 104 of the machine learning device 100.

The data acquisition unit 32, preprocessing unit 34, state observation unit 106, determination unit 120, and analysis unit 140 according to the present embodiment share the same functions with the data acquisition unit 32, preprocessing unit 34, state observation unit 106, determination unit 120, and analysis unit 140 according to the third embodiment.

The learning model adjustment unit 150 according to the present embodiment is a functional means for adjusting a learning model created based on the operating state of a specified machine tool 2 together with the operating state of another machine tool 2.

Figure 11:
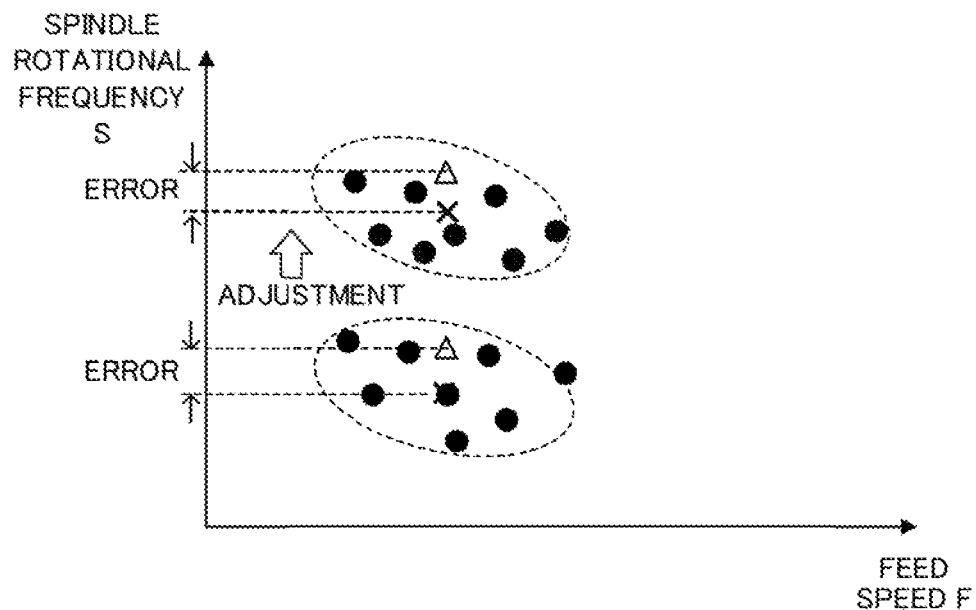
FIG. 11 is a diagram illustrating a method for adjusting the learning model generated by unsupervised learning for use in another machine tool.

A method of learning model adjustment by the learning model adjustment unit 150 will be described with reference to FIG. 11. FIG. 11 shows an example of a learning model created by unsupervised learning based on the operating state of a specified machine tool. Black spots in FIG. 11 represent state data acquired when no chatter vibration is generated in the specified machine tool. The learning model illustrated in FIG. 11 can be used for the estimation of the occurrence/non-occurrence of chatter vibration and the improvement of the chatter vibration in the machining by the specified machine tool. However, even if this learning model is used for the estimation of the occurrence/non-occurrence of chatter vibration and the improvement of the chatter vibration in another machine tool 2 of the same model as the specified machine tool, for example, correct estimation cannot be performed due to the machine difference between the specified machine tool and the second machine tool, errors in various parts, and the like.

A known feature of chatter vibration generated in the machine tool 2 lies in that a stable region is enlarged in the vicinity of the spindle rotational frequency at which the cutting edge passage frequency (spindle rotational speed× number of tool blades) of the tool is a fraction of an integer of the resonant frequency of the machine structure. The period of the spindle rotational frequency at which the stable region is enlarged can be given by Equation 1 below. In Equation 1, fc is the resonant frequency of the machine and N is the number of tool blades.

$$\text{Period of spindle rotational frequency for stable region} = 60\ fc/N. \tag{1}$$

On the other hand, the center position of each cluster is estimated to indicate the position of a machining condition for the minimum value of chatter vibration in the specified machine tool 2, in the learning model created in the specified machine tool 2. Moreover, if the machine structure is not changed, its resonant frequency has no substantial difference. Thereupon, state variables (spindle rotational frequencies S) for some stable regions (minimum values of chatter vibration) are obtained in advance by conducting an experiment in which the spindle rotational frequency is changed as the chatter vibration is measured with other machining conditions than the spindle rotational frequency in the alternative machine tool 2 fixed. The obtained state variables are compared with the respective center positions of the individual clusters (estimated to be the stable regions of the specified machine tool 2) in the learning model created in the specified machine tool 2, and the learning model is adjusted so as to correct the resulting errors. Consequently, the adjusted learning model can be used for the estimation of the occurrence/non-occurrence of chatter vibration and the improvement of the chatter vibration in the alternative machine tool 2.

If a command for the adjustment of the learning model and the state variables for the stable regions in the (alternative) machine tool 2 are input from the display/MDI unit 70 and the like, for example, the learning model adjustment unit 150 adjusts the learning model by executing the above-described processing using the input state variables for the stable regions and the learning models stored in the learning model storage unit 130. The adjusted learning model is newly stored into the learning model storage unit 130. The adjusted learning model is used for the estimation of the occurrence/non-occurrence of chatter vibration estimated by the determination unit 120 and the analysis unit 140 and the improvement of the chatter vibration.

Figure 12:
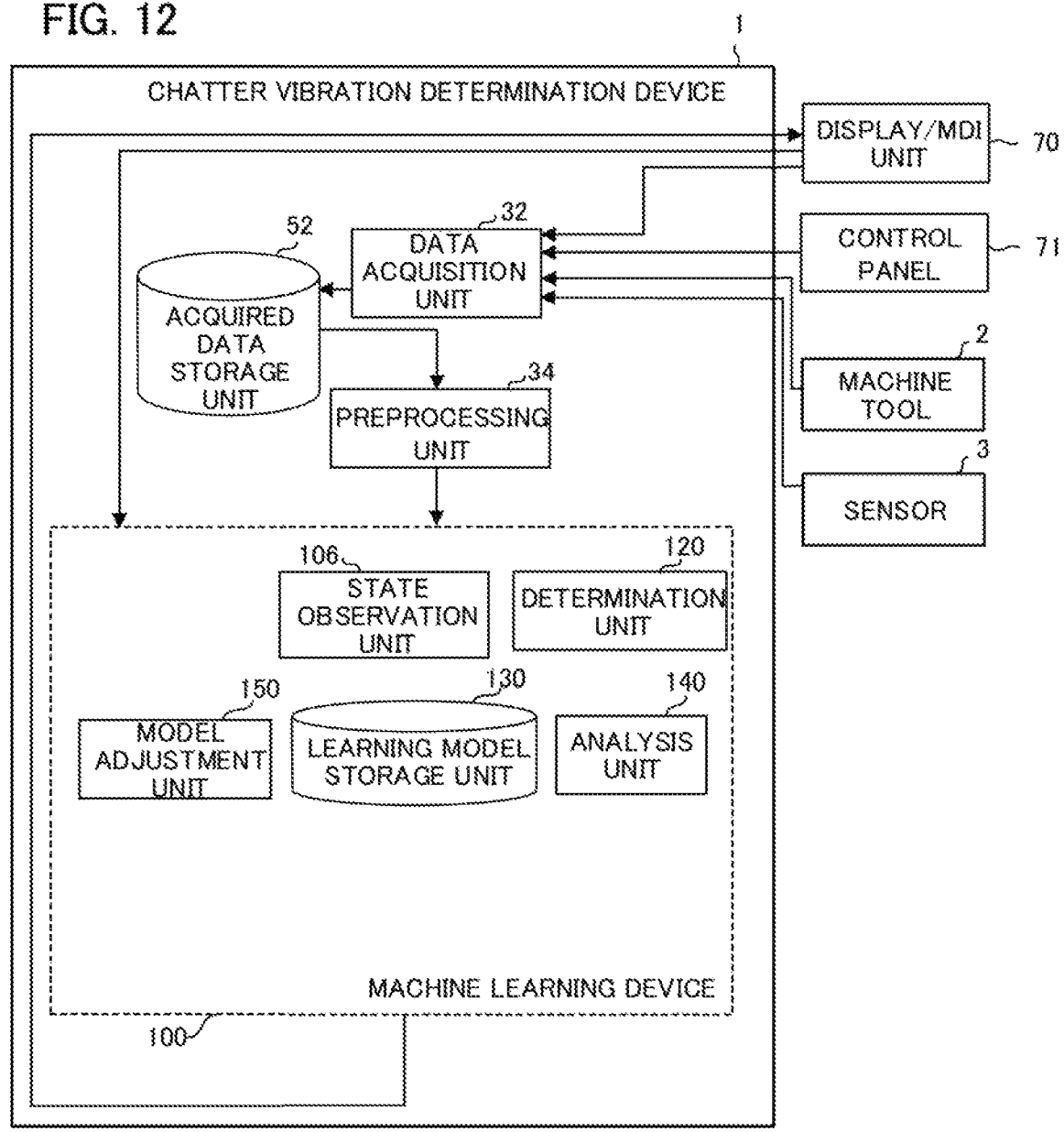
FIG. 12 is a schematic functional block diagram of the chatter vibration determination device according to the fourth embodiment.

FIG. 12 is a schematic functional block diagram of a chatter vibration determination device 1 and a machine learning device 100 according to a sixth embodiment. The chatter vibration determination device 1 of the present embodiment has a configuration required when the machine learning device 100 performs estimation processing using a learning model created by supervised learning (estimation mode). Each functional block shown in FIG. 12 is implemented as the CPU 11 of the chatter vibration determination device 1 and the processor 101 of the machine learning device 100 shown in FIG. 1 execute their respective system programs and control the operation of each part of the chatter vibration determination device 1 and the machine learning device 100.

The chatter vibration determination device 1 of the present embodiment comprises a data acquisition unit 32 and a preprocessing unit 34. The machine learning device 100 of the chatter vibration determination device 1 comprises a state observation unit 106, determination unit 120, analysis unit 140, and learning model adjustment unit 150. Moreover, an acquired data storage unit 52 stored with data acquired from a machine tool 2 and a sensor 3 is provided on a non-volatile memory 14. A learning model storage unit 130 configured to store learning models constructed by machine learning by a learning unit 110 is provided on a non-volatile memory 104 of the machine learning device 100.

The data acquisition unit 32, preprocessing unit 34, state observation unit 106, determination unit 120, and analysis unit 140 according to the present embodiment share the same functions with the data acquisition unit 32, preprocessing unit 34, state observation unit 106, determination unit 120, and analysis unit 140 according to the fourth embodiment.

The learning model adjustment unit 150 according to the present embodiment adjusts a learning model created based on the operating state of a specified machine tool 2 together with the operating state of another machine tool 2.

Figure 13:
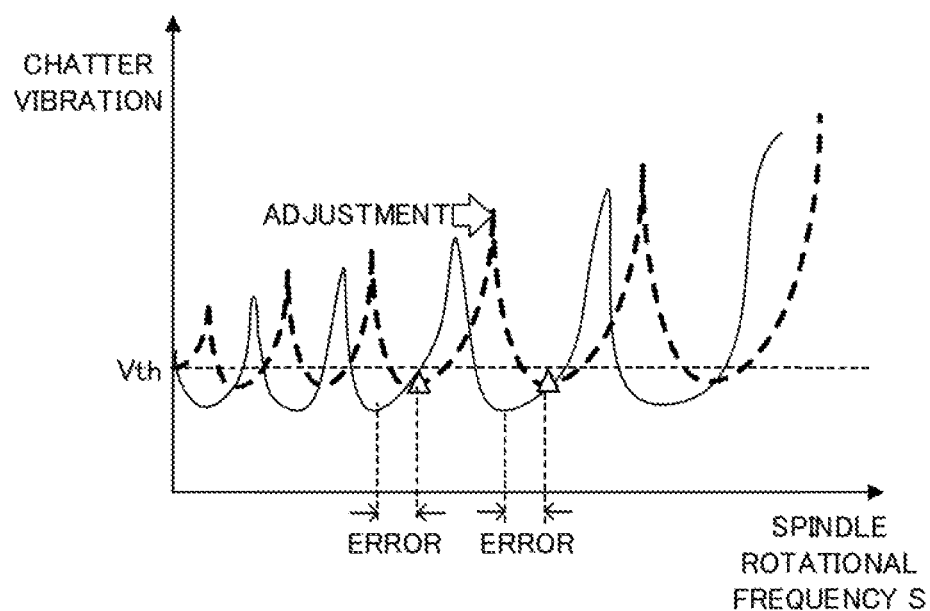
FIG. 13 is a diagram illustrating a method for adjusting the learning model generated by supervised learning for use in the alternative machine tool.

A method of learning model adjustment by the learning model adjustment unit 150 will be described with reference to FIG. 13. In FIG. 13, a thin solid line represents an example of a learning model created by supervised learning based on the operating state of a specified machine tool. A thick dotted line of FIG. 13 represents a standard model of chatter vibration according to the machining condition. The learning model illustrated in FIG. 13 can be used for the estimation of the occurrence/non-occurrence of chatter vibration and the improvement of the chatter vibration in the machining by the specified machine tool. However, even if this learning model is used for the estimation of the occurrence/non-occurrence of chatter vibration and the improvement of the chatter vibration in another machine tool 2 of the same model as the specified machine tool, for example, correct estimation cannot be performed due to the machine difference between the specified machine tool and the second machine tool, errors in various parts, and the like.

As is also described in connection with the fifth embodiment, the period of the spindle rotational frequency at which the stable region is enlarged can be given by Equation 1. On the other hand, each minimum value in the learning model created in the specified machine tool 2 is estimated to indicate the position of a machining condition for the minimum value of chatter vibration in the specified machine tool 2. Moreover, if the machine structure is not changed, its resonant frequency has no substantial difference. Thereupon, state variables (spindle rotational frequencies S) for some stable regions (minimum values of chatter vibration) are obtained in advance by conducting an experiment in which the spindle rotational frequency is changed as the chatter vibration is measured with other machining conditions than the spindle rotational frequency in the alternative machine tool 2 fixed. The obtained state variables are compared with the individual minimum values of chatter vibration in the learning model created in the specified machine tool 2, and the learning model is adjusted so as to correct the resulting errors. Consequently, the adjusted learning model can be used for the estimation of the occurrence/non-occurrence of chatter vibration and the improvement of the chatter vibration in the alternative machine tool 2.

If a command for the adjustment of the learning model and the state variables for the stable regions in the (alternative) machine tool 2 are input from the display/MDI unit 70 and the like, for example, the learning model adjustment unit 150 adjusts the learning model by executing the above-described processing using the input state variables for the stable regions and the learning models stored in the learning model storage unit 130. The adjusted learning model is newly stored into the learning model storage unit 130. The adjusted learning model is used for the estimation of the occurrence/non-occurrence of chatter vibration estimated by the determination unit 120 and the analysis unit 140 and the improvement of the chatter vibration.

While embodiments of the present invention have been described above, the invention is not limited to the examples of the above-described embodiments and may be suitably modified and embodied in various forms.

For example, the learning algorithm and arithmetic algorithm executed by the machine learning device 100, the control algorithm executed by the chatter vibration determination device 1, and the like are not limited to the above-described ones, and various algorithms are available for the purpose.

Moreover, while the chatter vibration determination device 1 and the machine learning device 100 are described as devices comprising different CPUs in the embodiments described above, the machine learning device 100 may be implemented by the CPU 11 of the chatter vibration determination device 1 and the system programs stored in the ROM 12.

While embodiments of the present invention have been described above, the invention is not limited to the examples of the above-described embodiments and may be suitably modified and embodied in other forms.

The invention claimed is:

1. A chatter vibration determination device configured to control a machine tool for cutting a workpiece by relatively moving the workpiece and a tool, the chatter vibration determination device comprising:

a processor configured to:
observe and generate a learning model of machining condition data related to the workpiece machining by the machine tool, the machining condition data including a feed speed and a spindle rotational frequency in the cutting as state data representative of a current state of environment;
execute processing related to machine learning using the learning model generated by modeling a relationship of chatter vibration with a machining condition for the cutting, based on the observed state data;
estimate an occurrence/non-occurrence of chatter vibration and an improvement plan for the chatter vibration;
output a result of the estimation of the occurrence/non-occurrence of the chatter vibration and the improvement plan for the chatter vibration; and
automatically adjust a currently set machining condition of the machine tool so that the chatter vibration is reduced, based on the result of the estimation and the improvement of the chatter vibration during the control of the machining tool for cutting the workpiece.

2. The chatter vibration determination device according to claim 1, wherein the learning model is a learning model as a cluster set created by performing unsupervised learning using, as learning data, the state data including the machining condition data including the feed speed and the spindle rotational frequency in the cutting, acquired in a state in which no chatter vibration occurs in the machine tool, and
the processor is further configured to estimate the occurrence/non-occurrence of chatter vibration based on the relationship between the state data observed from the machine tool and individual clusters included in the learning model, and to analyze the state data observed from the machine tool and the learning model and estimate the machining condition included in the machining condition data for the improvement of the chatter vibration when it is estimated by the processor that the chatter vibration occurs.

3. The chatter vibration determination device according to claim 2, wherein the processor further estimates an amount of adjustment of the machining condition included in the machining condition data for the improvement of the chatter vibration.

4. The chatter vibration determination device according to claim 1, wherein the learning model is a learning model created by performing supervised learning using, as learning data, a set of the state data including the machining condition data including the feed speed and the spindle rotational frequency in the cutting and label data including chatter vibration data indicative of a detected value of chatter vibration detected in the cutting, and the processor is further configured to estimate the occurrence/non-occurrence of chatter vibration based on an estimated value of chatter vibration obtained by inputting the state data observed from the machine tool to the learning model, and to analyze the state data observed from the machine tool and the learning model and estimate a machining condition included in the machining condition data for the improvement of the chatter vibration when it is estimated by the processor that the chatter vibration occurs.

5. The chatter vibration determination device according to claim 1, wherein the machining condition is automatically estimated based on the output of the result of the estimation of the occurrence/non-occurrence of the chatter vibration and the improvement of the chatter vibration by the processor.

6. The chatter vibration determination device according to claim 1, wherein guidance based on the output of the result of the estimation of the occurrence/non-occurrence of the chatter vibration and the improvement of the chatter vibration is displayed by the processor.

7. The chatter vibration determination device according to claim 1, wherein the processor is further configured to make an adjustment to use the learning model for the estimation of the occurrence/non-occurrence of chatter vibration in another machine tool different from the machine tool used for the creation of the learning model and the improvement of the chatter vibration.

8. A machine learning device, comprising:
a processor configured to:
observe and generate a learning model of machining condition data related to machining of a workpiece by a machine tool, the machining condition data including a feed speed and a spindle rotational frequency in cutting in the machine tool for cutting the workpiece by relatively moving the workpiece and the tool, as state data representative of a current state of environment,
execute processing related to machine learning using the learning model generated by modeling a relationship of chatter vibration with a machining condition for the cutting, based on the observed state data, and estimate the occurrence/non-occurrence of chatter vibration and an improvement plan for the chatter vibration;
output a result of the estimation of the occurrence/non-occurrence of the chatter vibration and the improvement plan for the chatter vibration to a chatter vibration determination device; and
the chatter vibration determination device automatically adjusts a currently set machining condition of the machine tool so that the chatter vibration is reduced, based on the result of the estimation and the improvement of the chatter vibration during a control of the machining tool for cutting the workpiece.

9. The machine learning device according to claim 8, wherein the learning model is a learning model as a cluster set created by performing unsupervised learning using, as learning data, the state data including the machining condition data including the feed speed and the spindle rotational frequency in the cutting, acquired in a state in which no chatter vibration occurs in the machine tool, the processor further configured to estimate the occurrence/non-occurrence of chatter vibration based on the relationship between the state data observed from the machine tool and individual clusters included in the learning model, and an analysis unit configured to analyze the state data observed from the machine tool and the learning model and estimate a machining condition included in the machining condition data for the improvement of the chatter vibration when it is estimated by the determination unit that the chatter vibration occurs.

10. The machine learning device according to claim 9, wherein the processor further estimates an amount of adjustment of the machining condition included in the machining condition data for the improvement of the chatter vibration.

11. The machine learning device according to claim 8, wherein the learning model is a learning model created by performing supervised learning using, as learning data, a set of the state data including the machining condition data including the feed speed and the spindle rotational frequency in the cutting and label data including chatter vibration data indicative of a detected value of chatter vibration detected in the cutting, the processor further configured to estimate the occurrence/non-occurrence of chatter vibration based on an estimated value of chatter vibration obtained by inputting the state data observed from the machine tool to the learning model, and to analyze the state data observed from the machine tool and the learning model and estimate a machining condition included in the machining condition data for the improvement of the chatter vibration when it is estimated by the processor that the chatter vibration occurs.

12. The machine learning device according to claim 8, wherein the processor is configured to make an adjustment to use the learning model for the estimation of the occurrence/non-occurrence of chatter vibration in another machine tool different from the machine tool used for the creation of the learning model and the improvement of the chatter vibration.

* * * * *